United States Patent
Becker et al.

(10) Patent No.: US 6,905,533 B2
(45) Date of Patent: Jun. 14, 2005

(54) FILTERING AND INERTING OF COMBUSTIBLE DUSTS IN THE PROCESS OFF-GAS

(75) Inventors: Franz Becker, Marktl (DE); Lothar Lehmann, Freiberg (DE); Horst Wachtler, Freiberg (DE)

(73) Assignee: Siltronic AG, Burghausen (DE)

( * ) Notice: Subject to any disclaimer, the term of this patent is extended or adjusted under 35 U.S.C. 154(b) by 140 days.

(21) Appl. No.: 10/410,841

(22) Filed: Apr. 10, 2003

(65) Prior Publication Data

US 2003/0200867 A1 Oct. 30, 2003

(30) Foreign Application Priority Data

Apr. 25, 2002 (DE) .......................................... 102 18 491

(51) Int. Cl.$^7$ ............................................. B01D 29/68
(52) U.S. Cl. ............................. 95/268; 95/273; 95/279; 55/302; 55/341.1; 55/523
(58) Field of Search .......................... 95/268, 273, 279, 95/280; 55/283, 302, 341.1, 523

(56) References Cited

U.S. PATENT DOCUMENTS 5,531,798 A * 7/1996 Engstrom et al. .............. 48/77
5,895,521 A * 4/1999 Otsuka et al. ................ 95/280
6,287,528 B1 * 9/2001 Weber ...................... 423/215.5

FOREIGN PATENT DOCUMENTS

| DE | 3705793 | 11/1987 |
| DE | 3603511 | 12/1988 |
| DE | 19854235 | 5/2000 |

OTHER PUBLICATIONS

English Derwent Abstract AN 1987–335863 corresponding to DE 3705793.
English Derwent Abstract AN 1987–222418 corresponding to DE 3603511.
English Derwent Abstract AN 2000–377549 corresponding to DE 19854235.

* cited by examiner

*Primary Examiner*—Robert A. Hopkins
(74) *Attorney, Agent, or Firm*—Brooks Kushman P.C.

(57) ABSTRACT

A method for avoiding the spontaneous ignition of combustible dusts in process off-gases, wherein during the process the dusts are retained, without adversely affecting the process parameters, at least one sintered filter element which is arranged in a pressure vessel and is able to withstand temperatures of up to at least 250° C. and after the process has ended the dusts are inerted by blasting oxygen-containing gas back into the pressure vessel, and to a device for carrying out the method.

13 Claims, 1 Drawing Sheet

FILTERING AND INERTING OF COMBUSTIBLE DUSTS IN THE PROCESS OFF-GAS

BACKGROUND OF THE INVENTION

1. Field of the Invention

The invention relates to a method for avoiding the spontaneous ignition of combustible dusts in process off-gases, and to a device for carrying out the method.

2. The Prior Art

Off-gases can be from installations in which thermal processes are carried out, such as for example firing installations, combustion furnaces or melting furnaces, These off-gases may contain dusts which, before they are discharged to the environment, generally have to be retained by means of filtration and if appropriate passivation. In particular metal oxide and/or semimetal oxide mixtures in medium oxidation states are highly reactive industrial dusts. These dusts may have spontaneous ignition temperatures of less than 100° C. and tend to cause filter fires or dust explosions in downstream off-gas filters, for example. In de-dusting facilities in which, by way of example, the off-gas is blown tangentially into a cyclone-like housing as in a cyclone separator, predominantly relatively large particles are deposited on the housing inner wall. The finer particles are separated out by means of a downstream filter, for example, a fabric or fiber filter. Filter apparatus of this type often cannot be used, on account of high process temperatures, sparks flying and spontaneous ignition of highly reactive dusts.

In plants for producing high-purity silicon ingots in single crystal form using the Czochralski crucible pulling process, silicon fragments, if appropriate with the addition of dopants, such as for example antimony, arsenic, boron or phosphorus, are placed in a heatable quartz crucible and melted. A crystal ingot in single crystal form grows at the end of a seed crystal as a result of the seed crystal being dipped into the melt and rotated and pulled in the vertical direction.

As a result of the contact with the surface of the quartz crucible, oxygen is supplied to the molten material. This oxygen is distributed within the molten material as a result of the convection caused by the supply of heat and the rotation. As a result, oxides of the constituents of the molten material are formed, these oxides evaporating via the surface of the molten material. In addition to various silicon oxides $SiO_x$ (x=0 to 2), in this way in particular the oxygen compounds of antimony and arsenic, as well as phosphorus, on account of their high vapor pressure, and to a certain extent also of boron, are released.

Since crucible pulling installations generally have shielding gas, preferably argon, flowing through them under a slight vacuum, the oxides of the constituents of the melt are discharged in different oxidation states into the off-gas stream from the crucible pulling installation. These finely distributed metal oxide/semimetal oxide mixtures in different oxidation states are highly reactive, ignite spontaneously and are toxic. These industrial dusts tend to cause filter fires or dust explosions in particular in the downstream off-gas filters.

DE 3603511 C2 describes a method and device for removing pollutants in dust and gas form from off-gases, in particular off-gases produced in the manufacture of optical waveguide preforms. In this manufacture, in a first stage, dust separation takes place by means of a dry fabric filter, which is preferably coated with polytetrafluoroethylene, In one or more further stages the gaseous pollutants from the dust-free off-gas are absorbed by means of an aqueous sodium hydroxide solution as absorption liquid which is flowing in an absorption liquid circuit.

In the case of the filtration of $SiO_x$ dusts by means of fabric filter elements, these elements, on account of their construction, cause glowing pockets and fires in the folds. This leads to the filter material being damaged and to the $SiO_x$ dust passing into the downstream pumps or into the environment via the pump off-gases. To keep the process parameters pressure and throughflow constant over the entire running time of the process, a very large filter surface area is required when using these filters. High gas flow rates at a low pressure are not possible, and consequently the choice of suitable process parameters for pulling the crystals is limited.

DE 19854235 A1 describes a method for passivating combustible, metallurgical dusts which are produced in the off-gas filter of crucible pulling installations, in particular of crucible pulling installations for pulling silicon single crystals. In these installations, the dusts in the off-gas stream from the crucible pulling installation are continuously passivated by means of a reaction gas at temperatures from 50 to 500° C. For continuous passivation, a reaction chamber with a heating device and at least one reaction gas inlet is introduced between the off-gas line of the crucible pulling installation and the off-gas filter. The temperature of the reaction chamber and the supply of reaction gas into the reaction chamber are regulated as a function of the crystal pulling conditions. The reaction gas used is air, oxygen, ozone or mixtures of these gases.

The passivation by means of a continuous feed of a reaction gas has the drawback that the reaction gas partial pressure in the gas chamber of the crucible pulling installation rises. The diffusion of oxygen back into the crucible pulling installation has an adverse effect on, for example, the conductivity of the silicon single crystal ingot. In order not to significantly impair the vacuum and shielding gas flow conditions required for the crucible pulling process and the oxygen content in the crucible pulling installation, the capacity of the oxidation device is limited in process engineering terms. Incomplete oxidation can cause highly reactive, spontaneously igniting and toxic oxides of the constituents of the melt to penetrate into the dust filter. This will produce glowing pockets and fires in the filter material and dust explosions, for example when the installation is being cleaned.

DE 3705793 describes a filter apparatus for gas cleaning and detoxification of off-gases from thermal processes, for example firing operations, combustion furnaces, melting furnaces or drying installations. In these thermal processes, dust and gaseous pollutants are removed from the off-gases by means of a combination of a dust filter which is insensitive to heat and flying sparks and a catalyst element in a single structural unit. These catalyst elements preferably consist of a large-cell foamed ceramic which is coated with catalytically suitable metal compounds or pure metals.

This catalyst, which is used to convert gaseous pollutants, has to be applied and fixed to the support material made from ceramics, woven fabrics or nonwovens made from high-temperature-resistant material, such as quartz fibers or stainless steel fibers. The dust filter elements are mounted upstream of the catalytically coated foam ceramic elements for subsequently converting the gaseous pollutants. The filter elements are difficult to clean, which in the case of highly reactive, spontaneously ignitible and toxic dusts, such as for example oxide mixtures of silicon doped with arsenic, phosphorus or antimony, leads to a high level of outlay in the filter cleaning infrastructure. This is in order to minimize risks to the health and safety of the cleaning staff.

SUMMARY OF THE INVENTION

It is an object of the present invention to avoid the abovementioned drawbacks of the prior art and in particular to provide a method for filtering and inerting dust particles in process off-gases which can be operated economically and not only removes highly reactive, spontaneously igniting and toxic dust particles, but also integrates the inerting of these dusts in the process, the intention being for the essential parameters of the process, temperature, pressure and gas flow rate, to be kept constant over the entire process run time within the widest possible range of parameters.

The above object is achieved according to the present invention by a method for avoiding the spontaneous ignition of combustible dust particles in process off-gases, wherein during the process the dusts are retained, without adversely affecting the process parameters, at least one sintered filter element which is arranged in a pressure vessel and is able to withstand temperatures of up to at least 250° C. and after the process has ended the dusts are inerted by blasting oxygen-containing gas back into the pressure vessel.

According to the invention, during the process the dusts are retained at least one filter element, and after the process has ended they are separated from the filter element or the filter elements by the oxygen-containing gas which flows in the opposite direction to the filtration during the process, are swirled into the pressure vessel chamber and are there inerted by the oxygen by means of oxidation.

By contrast, in the method according to the prior art, the gaseous reactive pollutants are firstly separated from the dusts by means of filtration and are then passivated at the catalyst elements. The dusts are retained at a filter element and are not treated further. Retained, highly reactive, spontaneously igniting and toxic dusts then have to be removed from the filter apparatus and disposed of, with the associated risks to people and to the environment.

According to a preferred embodiment, the invention relates to a method for filtering and inerting, by way of example, $SiO_x$ dusts, which may be doped with dopants selected from the group comprising arsenic, antimony, boron or phosphorus, in the process off-gas from crucible pulling installations for pulling silicon single crystals, comprising a) passing a process off-gases through a pressure vessel having at least one porous, sintered filter element, which can be regenerated, and can be re-used by being cleaned, and is made from stainless steel or ceramic, b) cleaning the filter element or the filter elements, after the crystal pulling process has ended, as a result of oxygen-containing gas flowing back into the clean gas side, in the opposite direction to a process direction of collected dusts, the collected dusts being swirled into a pressure vessel chamber and a back-flushing of the filter element or elements initiating an exothermic reaction on the part of the dusts in the pressure vessel chamber, with the results that the dusts are inerted by oxidation.

It is preferable for step b) to be carried out a number of times as a result of the pressure in the pressure vessel being reduced by means of downstream vacuum pumps, preferably to a range of <100 mbar, before back-flushing with oxygen-containing gas in the opposite direction. The pressure difference is in this case made as great as possible. The inerting is preferably repeated 3 to 5 times. Then, the filter apparatus with inerted volume and cleaned filter element or elements is/are available again for the next process.

The invention therefore enables retained, highly reactive, spontaneously igniting and toxic dusts or dust particles, after the process has ended, to be inerted by back-flushing with oxygen-containing gas, swirling up the dusts in the pressure vessel chamber and oxidation. After the back-flushing operation has been repeated a number of times as required, the inerted dusts can be removed from the system without danger and without dust fires occurring during filter cleaning or during disposal of the dusts. It is particularly advantageous if the pressure vessel has a discharge flange for the inerted dusts at the lower part of the pressure vessel. The filter apparatus is preferably emptied when the installation is not operating.

In the method in which pressures below atmospheric pressure are used in the process, vacuum pumps, preferably oil-sealed vacuum pumps, are connected downstream of the filter system. If the highly reactive, spontaneously igniting and toxic dusts contain particles with particle sizes smaller than the filter rate, they can be converted into the oil of the vacuum pump, where fine, unagglomerated particles with a size of less than 5 μm are bound in the oil of the pump. Larger particles and particle agglomerates cannot be oxidized or cannot be oxidized to a sufficient extent, on account of unfavorable surface conditions, so that the highly reactive, spontaneously igniting and toxic dusts represent a considerable potential danger to people and environment in the lines, filters, pumps and their off-gases. The method according to the invention leads to highly reactive, spontaneously igniting and toxic dusts being retained as a function of the filter rate of the filter element or elements. It is preferable to use filter elements with a filter rate of 0.3 to 12 μm, particularly preferably of 3 to 5 μm. It is preferable for the outgoing air from the reacting filter system to be fed to the process outgoing air.

Depending on the filter rate, the filter surface area is selected in such a way that the process parameters are not adversely affected and even high gas flow rates at low pressures become possible. The filter surface area is matched to the filter rate in such a way that the retention rate of the filter remains constant throughout the entire duration of the process. The filter surface area is preferably 0.5 to 5 $m^2$, particularly preferably 1 to 3 $m^2$.

A further important difference from the prior art includes the fact that the risk of fire in the filter system is eliminated. In the method according to the invention, at least one porous and sintered filter element, which is able to withstand temperatures of up to at least 250° C. and is made from stainless steel or ceramic, is used in a pressure vessel. This pressure vessel preferably consists of stainless steel and is able to withstand temperatures of up to at least 250° C. It is preferable for a plurality of filter elements to be present in a pressure vessel.

On account of the environmentally harmful nature of the dusts or dust particles in the presence of toxic compounds, for example of arsenic or antimony, the pressure vessel is expediently closed off by a ventilation valve. This prevents toxic or carcinogenic gases from escaping.

A further advantage of the method according to the invention is the constant retention rate of the filter unit not only throughout the entire duration of the process but also throughout the entire service life of the filter elements. This results in a reduction in the operating costs, since the filter elements do not have to be exchanged. The filter apparatus ensures high flow rates even at low pressure during the process.

Processes whose off-gases can have dusts filtered out of them by means of the method according to the invention are, for example, processes in which silicon is melted. An example includes the pulling of silicon single crystals in crucible pulling installations, the casting of polysilicon or the production of solar silicon.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF THE PREFERRED EMBODIMENTS

Figure 1:
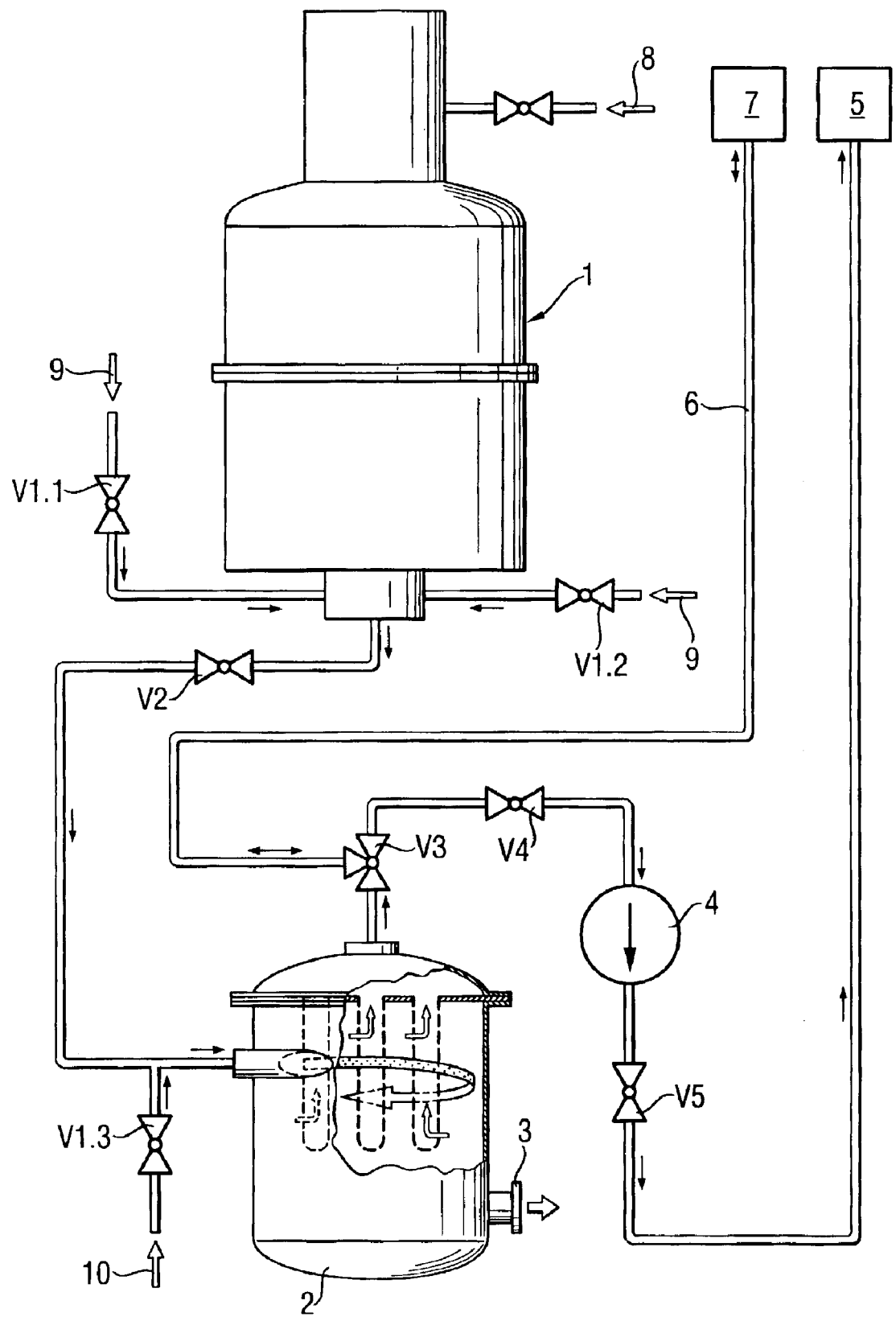
FIG. 1 diagrammatically depicts a preferred device which is suitable for carrying out the method of the invention.

Turning now in detail to the drawings, in the device shown in FIG.1, the process off-gases from a crucible pulling installation 1 are discharged into the off-gas line 5 through a pressure vessel 2 made from stainless steel, in which 19 regeneratable filter elements made from porous, sintered stainless steel for filtering dry gases with a filter surface area of 1.8 m$^2$ and a filter rate of 3 $\mu$m are fitted and through a vacuum system 4. into the off-gas line 5. During the crucible pulling process of a silicon single crystal ingot, the valve V2 is opened. In the crucible pulling installation, the vacuum system 4 generates a pressure of 10 to 500 mbar, and argon$^8$ is fed in at a volumetric flow rate of 300 to 10 000 liters (s.t.p.) per hour. The process off-gases passed tangentially into the pressure vessel via the direct line to the pressure vessel. There, the larger particles are separated out by means of the cyclone effect.

Then, the process off-gases are passed through the filter elements into the clean gas side of the filter apparatus. The fine separation takes place at the filter elements with a filter rate of 3 $\mu$m. Following the filter elements, the process off-gases pass via the control valve V4 into the vacuum system 4, which preferably comprises a roots pump and a blocking slide pump. In the vacuum system 4, for structural reasons, the wet separation and passivation of the fine dusts or dust particles with a size of smaller than 3 $\mu$m, of which a small amount is present, take place in the oil of the vacuum pump. Downstream of the vacuum system 4, the process off-gases which have now been cleaned are passed into the off-gas line 5.

After the process has ended and 120 minutes before the cooling time has ended, the valves V1.1, V1.2 and V1.3 are opened for air purging. With pumps running, the valves V1.1 and V1.2 together pass 2200 liters (s.t.p.) of fresh air 9 per hour into the off-gas pipes of the installation. The valve V1.3 passes a further 4500 liters (s.t.p.) of fresh air 10 per hour into the feed line to the untreated gas side of the filter apparatus.

The air purge is used for controlled oxidation in the off-gas lines of the crucible pulling installation and for primary oxidation of the filter cake in the filter candles. The air purge time is 30 minutes, during which time the valves V2, V4 and V5 are open. After 30 minutes, the valves V1.1, V1.2 and V1.3 are closed and the pressure in the installation is brought to 150 mbar. The valve V2 is closed, the valve V4 is open and the vacuum system continues to run. The back-flushing valve V3 is a 3-way valve which, when opening after 5 minutes, creates a connection from the pressure vessel 2 to the fresh air system with simultaneous closing of the line to the vacuum system 4.

In a further embodiment according to the invention, the back-flushing valve V3 is connected to compressed air. Fresh air or compressed air flows at a high speed through the open valve V3 into the clean gas side, which is under a vacuum, of the filter apparatus. The resulting pressure surge cleans the filter element and swirls up the dusts in the pressure vessel chamber, these dusts being mixed with oxygen. As a result, oxidation is initiated as an exothermic reaction of the dusts in the pressure vessel chamber. After an oxidation time of 20 minutes, the back-flushing valve V3 is switched to 3 minutes to allow passage to the vacuum system 4, which evacuates the pressure vessel 2 again. The back-flushing operation is repeated a total of three times.

The purging of the untreated gas side can be repeated after the cleaning of the filter elements. The cleaning of the filter apparatus is then ended, and the filter apparatus is available for a further process.

The inerted dusts are removed at the discharge flange 3 at regular intervals. The filter apparatus described in FIG. 1 can be used, for example, to pull up to 30 silicon single crystal ingots before the pressure vessel 2 has to be cleaned by removing it at the discharge flange 3.

In a further preferred embodiment, the ventilation line 6 of the pressure vessel 2 is connected to the process outgoing air line 7.

Accordingly, while a few embodiments of the present invention have been shown and described, it is to be understood that many changes and modifications may be made thereunto without departing from the spirit and scope of the invention as defined in the appended claims.

What is claimed is:

1. A method for avoiding the spontaneous ignition of combustible dusts in process off-gases of crucible pulling installations for the pulling of silicon single crystal installations; comprising during a process retaining the dusts, without adversely affecting process parameters;

arranging at least one sintered filter element in a pressure vessel, and said filter element is able to withstand temperatures of up to at least 250° C.;

and after the process has ended the dusts are inerted by blasting oxygen-containing gas back into the pressure vessel.

2. The method as claimed in claim 1, wherein the dusts contain oxides selected from the group consisting of silicon, boron, phosphorus, arsenic and antimony and oxide mixtures thereof.

3. The method as claimed in claim 1, wherein the filter rate of at least one sintered filter elements, which is able to withstand temperatures of up to at least 250° C., is 0.3 to 15 $\mu$m.

4. The method as claimed in claim 1, wherein the at least one sintered filter element, which are able to withstand temperatures of up to at least 250° C. in the pressure vessel, is selected from the group consisting of ceramic and stainless steel.

5. The method as claimed in claim 1, wherein a pressure of from 10 to 500 mbar is used in the process.

6. The method as claimed in claim 1, wherein inert shielding gases selected from the group consisting of nitrogen and argon are used in the process with a gas flow rate of from 300 to 10,000 liters (s.t.p.) per hour.

7. The method as claimed in claim 1, wherein after the process is ended, carrying out the steps of
(a) evacuating the pressure vessel; and
(b) ventilating the pressure vessel with oxygen-containing gas in a direction opposite to filtering the dusts which have collected at the filter elements flowing into the pressure vessel chamber and in the process being inerted by reacting with oxygen; and
said steps (a) and (b) are carried out alternately in succession, in each case at least once.

8. The method as claimed in claim 7, wherein the oxygen-containing gas is selected from the group consisting of compressed air.

9. The method as claimed in claim 1, wherein outgoing air from the at least one sintered filter element is fed to the process outgoing air.

10. A silicon wafer obtainable from a method as claimed in claim 1.

11. A method for avoiding the spontaneous ignition of combustible dusts in process off-gases; comprising during a process retaining the dusts, without adversely affecting process parameters;

arranging at least one sintered filter element in a pressure vessel, and said filter element is able to withstand temperatures of up to at least 250° C.;

and after the process has ended the dusts are inerted by blasting oxygen-containing gas back into the pressure vessel;

wherein the process is melting a substance selected from the group consisting of silicon and silicon which contains dopants.

12. A device for carrying out a method for avoiding the spontaneous ignition of combustible dusts in process off-gases, which device comprises
(a) a process installation, in which off-gases containing highly reactive, spontaneously igniting and toxic dusts are formed;
(b) an off-gas discharge, which can be closed off with respect to the process installation, including at least one valve for supplying fresh air;
(c) a pressure vessel with discharge flange, in which at least one sintered filter element, which is able to withstand temperatures of up to at least 250° C., is arranged,
(d) a vacuum system;
(e) a ventilation line; and
(f) a nonreturn valve, which is connected to the pressure vessel, the vacuum system and the ventilation, line.

13. The device as claimed in claim 12, wherein the process installation is a crucible pulling installation.

* * * * *